(12) United States Patent
Parker (10) Patent No.: US 9,447,657 B2
(45) Date of Patent: Sep. 20, 2016

(54) SYSTEM AND METHOD FOR SCALE INHIBITION

(75) Inventor: Wiley L. Parker, Houston, TX (US)

(73) Assignee: THE LUBRIZOL CORPORATION, Wickliffe, OH (US)

( * ) Notice: Subject to any disclaimer, the term of this patent is extended or adjusted under 35 U.S.C. 154(b) by 1311 days.

(21) Appl. No.: 12/750,335

(22) Filed: Mar. 30, 2010

(65) Prior Publication Data

US 2011/0240131 A1  Oct. 6, 2011

(51) Int. Cl.
*C02F 1/46* (2006.01)
*C02F 1/52* (2006.01)
(Continued)

(52) U.S. Cl.
CPC ............. *E21B 37/06* (2013.01); *C02F 1/4602* (2013.01); *C02F 1/5272* (2013.01); *C02F 5/08* (2013.01);
(Continued)

(58) Field of Classification Search
CPC .............. C02F 5/12; C02F 1/66; C02F 1/78; C02F 1/4606; C02F 9/00; C02F 5/00; C02F 5/02; C02F 5/08; C02F 5/10; C02F 5/105; C02F 5/125; C02F 5/14; C02F 5/145; C02F 1/52; C02F 1/5209; C02F 1/5236; C02F 1/5272; C02F 1/54; C02F 1/542; C02F 1/56; C02F 1/46; C02F 1/4608; C02F 1/461; C02F 1/46104; C02F 1/46109; C02F 1/463; C02F 1/465; C02F 2303/20; C02F 1/4602; B03C 1/288; B03C 1/01; B03C 1/30; E21B 21/06; E21B 21/068; E21B 37/06; C23F 14/00; C23F 15/00; F16L 58/00; F17D 1/16; Y10T 137/0391

USPC ........ 210/596–701, 198.1, 243, 748.01, 695, 210/702–738, 696–702, 748.16, 749, 259, 210/202; 204/545, 553, 554, 559, 565, 204/567–571; 166/248; 205/724, 730, 731, 205/735; 422/7, 14, 22; 252/175; 137/13
See application file for complete search history.

(56) References Cited

U.S. PATENT DOCUMENTS 2,196,042 A    4/1940   Timpson ........................... 23/11
2,390,153 A   12/1945   Kern ................................ 260/72
(Continued)

FOREIGN PATENT DOCUMENTS

CA    2125513    1/1995
DE    4027300    5/1992    ............. B10D 53/14
(Continued)

OTHER PUBLICATIONS

English abstract of Tateno et al, "Steam boiler device and method for operating steam boiler device", pub. date: Dec. 4, 2002.*
(Continued)

Primary Examiner — Joseph Drodge
(74) Attorney, Agent, or Firm — Robert W. Strozier (57) ABSTRACT

The present invention discloses methods for inhibiting scale formation or precipitate formation in oil field flow lines and processing equipment exposed to fluid containing components that form scale or precipitates on surfaces of oil field flow lines and processing equipment, especially in highly paraffinic crude oils, where the method and system include applying an electric field across the fluid flowing through a flow line, where the fluid includes a scale or precipitate inhibitor and where the fluid strength and the inhibitor concentration is sufficient to reduce or prevent scale or precipitant formation.

10 Claims, 7 Drawing Sheets

(51) Int. Cl.
  *E21B 21/06* (2006.01)
  *C23F 15/00* (2006.01)
  *F16L 58/00* (2006.01)
  *F17D 1/16* (2006.01)
  *E21B 37/06* (2006.01)
  *C02F 5/08* (2006.01)
  *C02F 5/14* (2006.01)

(52) U.S. Cl.
  CPC ............... *C02F 5/14* (2013.01); *C23F 15/00* (2013.01); *F16L 58/00* (2013.01); *F17D 1/16* (2013.01); *Y10T 137/0391* (2015.04)

(56) References Cited

U.S. PATENT DOCUMENTS

| | | | |
|---|---|---|---|
| 2,805,958 A | 7/1959 | Bueche et al. ............... 106/308 |
| 3,059,909 A | 10/1962 | Wise ........................ 261/39.3 |
| 3,163,219 A | 12/1964 | Wyant et al. ................ 166/283 |
| 3,301,723 A | 1/1967 | Chrisp ........................ 149/20 |
| 3,301,848 A | 1/1967 | Halleck ..................... 536/123.1 |
| 3,303,896 A | 2/1967 | Tillotson et al. ............... 175/69 |
| 3,317,430 A | 5/1967 | Priestley et al. .............. 510/503 |
| 3,565,176 A | 2/1971 | Wittenwyler ................ 166/270 |
| 3,856,921 A | 12/1974 | Shrier et al. ................ 423/228 |
| 3,888,312 A | 6/1975 | Tiner et al. ................ 166/308.5 |
| 3,931,038 A | 1/1976 | Mochi-Bartolani et al. |
| 3,933,205 A | 1/1976 | Kiel ........................ 166/308.1 |
| 3,937,283 A | 2/1976 | Blauer et al. ................ 166/307 |
| 3,947,341 A | 3/1976 | Taylor |
| 3,960,736 A | 6/1976 | Free et al. .................... 507/216 |
| 3,965,003 A | 6/1976 | Stanford et al. |
| 3,965,027 A | 6/1976 | Boffardi et al. |
| 3,965,982 A | 6/1976 | Medlin ...................... 166/249 |
| 3,966,630 A | 6/1976 | Quinlan |
| 3,976,589 A | 8/1976 | Mitchell |
| 3,981,740 A | 9/1976 | Czajkowski |
| 3,981,779 A | 9/1976 | Block et al. |
| 3,990,978 A | 11/1976 | Hill ......................... 507/235 |
| 4,007,792 A | 2/1977 | Meister ...................... 166/308.2 |
| 4,008,164 A | 2/1977 | Watson et al. |
| 4,032,460 A | 6/1977 | Zilch et al. |
| 4,052,159 A | 10/1977 | Fuerst et al. |
| 4,067,389 A | 1/1978 | Savins ........................ 166/246 |
| 4,079,006 A | 3/1978 | Mitchell |
| 4,088,574 A | 5/1978 | Quinlan |
| 4,108,782 A | 8/1978 | Thompson ................... 507/205 |
| 4,112,050 A | 9/1978 | Sartori et al. ................ 423/223 |
| 4,112,051 A | 9/1978 | Sartori et al. ................ 423/223 |
| 4,112,052 A | 9/1978 | Sartori et al. ................ 423/223 |
| 4,113,631 A | 9/1978 | Thompson ................... 507/202 |
| 4,255,259 A | 3/1981 | Hwa et al. |
| 4,306,991 A | 12/1981 | Hwa et al. |
| 4,342,652 A | 8/1982 | Schiller et al. |
| 4,378,845 A | 4/1983 | Medlin et al. ................ 166/297 |
| 4,455,235 A | 6/1984 | Boutin et al. |
| 4,461,716 A | 7/1984 | Barbarin et al. .............. 252/307 |
| 4,476,930 A | 10/1984 | Watanabe |
| 4,479,041 A | 10/1984 | Fenwick et al. ............ 200/81 R |
| 4,485,874 A | 12/1984 | Meyers |
| 4,495,996 A | 1/1985 | Meyers et al. |
| 4,506,734 A | 3/1985 | Nolte ........................ 166/308.1 |
| 4,514,309 A | 4/1985 | Wadhwa ..................... 507/211 |
| 4,541,935 A | 9/1985 | Constien et al. .............. 507/225 |
| 4,549,608 A | 10/1985 | Stowe et al. ................ 166/280.1 |
| 4,561,985 A | 12/1985 | Glass, Jr. .................... 507/108 |
| 4,566,973 A | 1/1986 | Masler, III et al. |
| 4,590,996 A | 5/1986 | Hoskin et al. |
| 4,617,129 A | 10/1986 | Lees |
| 4,623,021 A | 11/1986 | Stowe ........................ 166/250.1 |
| 4,654,266 A | 3/1987 | Kachnik ..................... 428/403 |
| 4,657,081 A | 4/1987 | Hodge ....................... 166/380.5 |
| 4,660,643 A | 4/1987 | Perkins ...................... 166/283 |
| 4,673,508 A | 6/1987 | Coleman et al. |
| 4,680,124 A | 7/1987 | Young et al. |
| 4,683,068 A | 7/1987 | Kucera ........................ 507/201 |
| 4,686,052 A | 8/1987 | Baranet et al. ................ 507/244 |
| 4,695,389 A | 9/1987 | Kubala ....................... 507/244 |
| 4,705,113 A | 11/1987 | Perkins ....................... 166/302 |
| 4,714,115 A | 12/1987 | Uhri .......................... 166/308.1 |
| 4,718,490 A | 1/1988 | Uhri .......................... 166/281 |
| 4,724,905 A | 2/1988 | Uhri .......................... 166/250.1 |
| 4,725,372 A | 2/1988 | Teot et al. ..................... 507/129 |
| 4,738,897 A * | 4/1988 | McDougall ............... C09K 8/54  252/180 |
| 4,739,834 A | 4/1988 | Peiffer et al. ................ 166/308.4 |
| 4,741,400 A | 5/1988 | Underdown |
| 4,741,401 A | 5/1988 | Walles et al. ................ 166/300 |
| 4,748,011 A | 5/1988 | Baize ......................... 423/228 |
| 4,779,679 A | 10/1988 | Snavely, Jr. et al. |
| 4,779,680 A | 10/1988 | Sydansk ...................... 166/300 |
| 4,784,774 A | 11/1988 | Amjad et al. |
| 4,787,455 A | 11/1988 | Snavely, Jr. et al. |
| 4,795,574 A | 1/1989 | Syrinek et al. ............... 507/238 |
| 4,799,995 A | 1/1989 | Crump et al. |
| 4,817,717 A | 4/1989 | Jennings, Jr. et al. ........ 166/278 |
| 4,830,106 A | 5/1989 | Uhri .......................... 166/250.1 |
| 4,846,277 A | 7/1989 | Khalil et al. ................. 166/280.1 |
| 4,848,468 A | 7/1989 | Hazlett et al. ................ 166/300 |
| 4,852,650 A | 8/1989 | Jennings, Jr. et al. ....... 166/250.1 |
| 4,857,205 A | 8/1989 | Redmore et al. |
| 4,860,829 A | 8/1989 | Carlberg et al. |
| 4,869,322 A | 9/1989 | Vogt, Jr. et al. ............. 166/280.1 |
| 4,879,045 A * | 11/1989 | Eggerichs ................... 210/695 |
| 4,892,147 A | 1/1990 | Jennings, Jr. et al. ....... 166/280.2 |
| 4,913,822 A | 4/1990 | Chen et al. |
| 4,926,940 A | 5/1990 | Stromswold .................. 166/247 |
| 4,931,189 A | 6/1990 | Dhawan et al. |
| 4,938,286 A | 7/1990 | Jennings, Jr. ................ 166/280.1 |
| 4,978,512 A | 12/1990 | Dillon ........................ 423/226 |
| 5,000,856 A * | 3/1991 | Chen ......................... C02F 5/10  210/699 |
| 5,002,126 A | 3/1991 | Carlberg et al. |
| 5,005,645 A | 4/1991 | Jennings, Jr. et al. ....... 166/280.1 |
| 5,023,001 A | 6/1991 | Amjad et al. |
| 5,024,276 A | 6/1991 | Borchardt ................... 166/308.6 |
| 5,053,161 A * | 10/1991 | Sprague ..................... C23F 11/10  210/699 |
| 5,067,556 A | 11/1991 | Fudono et al. ............... 62/196.4 |
| 5,074,359 A | 12/1991 | Schmidt ...................... 166/280.1 |
| 5,074,991 A | 12/1991 | Weers ........................ 208/236 |
| 5,082,579 A | 1/1992 | Dawson ....................... 507/211 |
| 5,090,479 A | 2/1992 | Read et al. |
| 5,106,518 A | 4/1992 | Cooney et al. ................ 507/21 |
| 5,110,486 A | 5/1992 | Manalastas et al. .......... 507/260 |
| 5,112,496 A | 5/1992 | Dhawan et al. |
| 5,141,655 A | 8/1992 | Hen |
| 5,160,630 A | 11/1992 | Clubbley et al. |
| 5,169,411 A | 12/1992 | Weers ........................ 44/421 |
| 5,221,487 A | 6/1993 | Carter |
| 5,224,546 A | 7/1993 | Smith et al. ................. 166/300 |
| 5,228,510 A | 7/1993 | Jennings, Jr. et al. ........ 166/263 |
| 5,246,073 A | 9/1993 | Sandiford et al. ............ 166/295 |
| 5,259,455 A | 11/1993 | Nimerick et al. ............ 166/308.5 |
| 5,259,985 A * | 11/1993 | Nakanishi et al. ........... 210/700 |
| 5,263,539 A | 11/1993 | Salimi et al. |
| 5,263,541 A | 11/1993 | Barthorpe et al. |
| 5,277,823 A | 1/1994 | Hann et al. |
| 5,294,371 A | 3/1994 | Clubley et al. |
| 5,298,221 A | 3/1994 | Carter |
| 5,306,429 A | 4/1994 | Wood et al. |
| 5,330,005 A | 7/1994 | Card et al. ................... 166/280.2 |
| 5,342,530 A | 8/1994 | Aften et al. ................. 252/8.551 |
| 5,347,004 A | 9/1994 | Rivers et al. ................ 544/180 |
| 5,360,550 A | 11/1994 | Clubley et al. |
| 5,363,919 A | 11/1994 | Jennings, Jr. ............... 166/308.1 |
| 5,399,270 A | 3/1995 | Hen |
| 5,402,846 A | 4/1995 | Jennings, Jr. et al. ........ 166/259 |
| 5,411,091 A | 5/1995 | Jennings, Jr. ................ 166/280.1 |
| 5,424,284 A | 6/1995 | Patel et al. ................... 507/129 |
| 5,439,055 A | 8/1995 | Card et al. ................... 166/280.2 |
| 5,462,721 A | 10/1995 | Pounds et al. ............... 423/226 |
| 5,465,792 A | 11/1995 | Dawson et al. ............. 166/295 |
| 5,472,049 A | 12/1995 | Chaffee et al. ............. 166/250.1 |

(56) References Cited

U.S. PATENT DOCUMENTS

| | | | |
|---|---|---|---|
| 5,482,116 A | 1/1996 | El-Rabaa et al. | 166/250.1 |
| 5,488,083 A | 1/1996 | Kinsey, III et al. | 507/211 |
| 5,497,831 A | 3/1996 | Hainey et al. | 166/308.1 |
| 5,501,275 A | 3/1996 | Card et al. | 166/280.2 |
| 5,551,516 A | 9/1996 | Norman et al. | 166/308.2 |
| 5,604,185 A | 2/1997 | Hen | |
| 5,616,278 A | 4/1997 | Carey et al. | |
| 5,624,886 A | 4/1997 | Dawson et al. | 507/217 |
| 5,635,458 A | 6/1997 | Lee et al. | 507/240 |
| 5,649,596 A | 7/1997 | Jones et al. | 166/300 |
| 5,667,677 A * | 9/1997 | Stefanini | 210/222 |
| 5,669,447 A | 9/1997 | Walker et al. | 166/300 |
| 5,674,377 A | 10/1997 | Sullivan, III et al. | 208/208 R |
| 5,688,478 A | 11/1997 | Pounds et al. | 423/228 |
| 5,693,837 A | 12/1997 | Smith et al. | 556/148 |
| 5,711,396 A | 1/1998 | Joerg et al. | 180/444 |
| 5,722,490 A | 3/1998 | Ebinger | 166/281 |
| 5,725,778 A * | 3/1998 | Cho et al. | 210/695 |
| 5,744,024 A | 4/1998 | Sullivan, III et al. | 208/236 |
| 5,755,286 A | 5/1998 | Ebinger | 166/281 |
| 5,755,971 A | 5/1998 | Palardy et al. | |
| 5,775,425 A | 7/1998 | Weaver et al. | 166/276 |
| 5,787,986 A | 8/1998 | Weaver et al. | 166/280.2 |
| 5,788,857 A | 8/1998 | Yang et al. | |
| 5,806,597 A | 9/1998 | Tjon-Joe-Pin et al. | 166/300 |
| 5,807,812 A | 9/1998 | Smith et al. | 507/238 |
| 5,833,000 A | 11/1998 | Weaver et al. | 166/276 |
| 5,853,048 A | 12/1998 | Weaver et al. | 166/279 |
| 5,858,245 A | 1/1999 | Gallup | |
| 5,871,049 A | 2/1999 | Weaver et al. | 166/276 |
| 5,877,127 A | 3/1999 | Card et al. | 507/273 |
| 5,897,765 A * | 4/1999 | Mercier | C02F 1/4602 204/228.6 |
| 5,908,073 A | 6/1999 | Nguyen et al. | 166/276 |
| 5,908,814 A | 6/1999 | Patel et al. | 507/131 |
| 5,964,295 A | 10/1999 | Brown et al. | 166/308.2 |
| 5,979,557 A | 11/1999 | Card et al. | 166/300 |
| 5,980,845 A | 11/1999 | Cherry | 423/229 |
| 6,016,871 A | 1/2000 | Burts, Jr. | 166/300 |
| 6,035,936 A | 3/2000 | Whalen | 166/308.5 |
| 6,047,772 A | 4/2000 | Weaver et al. | 166/276 |
| 6,054,417 A | 4/2000 | Graham et al. | 507/238 |
| 6,059,034 A | 5/2000 | Rickards et al. | 166/280.2 |
| 6,060,436 A | 5/2000 | Snyder et al. | 507/266 |
| 6,069,118 A | 5/2000 | Hinkel et al. | 507/277 |
| 6,123,394 A | 9/2000 | Jeffrey | 299/16 |
| 6,133,205 A | 10/2000 | Jones | 507/276 |
| 6,147,034 A | 11/2000 | Jones et al. | 507/238 |
| 6,162,391 A | 12/2000 | Kowata et al. | |
| 6,162,449 A | 12/2000 | Maier et al. | 424/401 |
| 6,162,766 A | 12/2000 | Muir et al. | 507/267 |
| 6,169,058 B1 | 1/2001 | Le et al. | 507/222 |
| 6,228,812 B1 | 5/2001 | Dawson et al. | 507/221 |
| 6,232,419 B1 | 5/2001 | Duggirala et al. | |
| 6,247,543 B1 | 6/2001 | Patel et al. | 175/64 |
| 6,258,250 B1 | 7/2001 | Weissenbacker et al. | |
| 6,267,938 B1 | 7/2001 | Warrender et al. | 423/226 |
| 6,283,212 B1 | 9/2001 | Hinkel et al. | 166/279 |
| 6,291,405 B1 | 9/2001 | Lee et al. | 507/136 |
| 6,330,916 B1 | 12/2001 | Rickards et al. | 166/280.2 |
| 6,725,931 B2 | 4/2004 | Nguyen et al. | 166/280.2 |
| 6,740,231 B1 | 5/2004 | Bauman et al. | |
| 6,756,345 B2 | 6/2004 | Pakulski et al. | 507/246 |
| 6,793,018 B2 | 9/2004 | Dawson et al. | 166/300 |
| 6,832,650 B2 | 12/2004 | Nguyen et al. | 166/279 |
| 6,875,728 B2 | 4/2005 | Gupta et al. | 507/240 |
| 6,929,749 B2 | 8/2005 | Duke et al. | |
| 6,949,193 B2 | 9/2005 | Duke et al. | |
| 6,998,092 B2 | 2/2006 | Duke et al. | |
| 7,122,148 B2 | 10/2006 | Duke et al. | |
| 7,140,433 B2 | 11/2006 | Gatlin et al. | 166/250.01 |
| 7,147,768 B2 | 12/2006 | Breault | |
| 7,268,100 B2 | 9/2007 | Kippie et al. | 507/244 |
| 7,332,459 B2 | 2/2008 | Collins et al. | |
| 7,350,579 B2 | 4/2008 | Gatlin et al. | 166/308.3 |
| 7,392,847 B2 | 7/2008 | Gatlin et al. | 166/280.2 |
| 7,419,603 B2 | 9/2008 | Cho | |
| 7,517,447 B2 | 4/2009 | Gatlin | 208/236 |
| 7,565,933 B2 | 7/2009 | Kippie et al. | |
| 7,566,686 B2 | 7/2009 | Kippie et al. | 507/213 |
| 7,712,535 B2 | 5/2010 | Venditto et al. | |
| 7,767,628 B2 | 8/2010 | Kippie et al. | 507/102 |
| 2002/0049256 A1 | 4/2002 | Bergeron, Jr. | 514/674 |
| 2002/0165308 A1 | 11/2002 | Kinniard et al. | 524/492 |
| 2003/0220204 A1 | 11/2003 | Baran, Jr. et al. | 507/200 |
| 2005/0045330 A1 | 3/2005 | Nguyen et al. | 166/281 |
| 2005/0092489 A1 | 5/2005 | Welton et al. | 166/280.2 |
| 2005/0137114 A1 | 6/2005 | Gatlin et al. | 510/424 |
| 2005/0250666 A1 | 11/2005 | Gatlin et al. | 510/492 |
| 2006/0191851 A1 * | 8/2006 | Mizuno et al. | 210/699 |
| 2006/0194700 A1 | 8/2006 | Gatlin et al. | 507/203 |
| 2007/0032693 A1 | 2/2007 | Gatlin et al. | 507/239 |
| 2007/0173413 A1 | 7/2007 | Lukocs et al. | 507/238 |
| 2007/0173414 A1 | 7/2007 | Wilson, Jr. | 507/131 |
| 2008/0067129 A1 * | 3/2008 | Juenke et al. | 210/695 |
| 2008/0185328 A1 | 8/2008 | Stefanini | |
| 2008/0197085 A1 | 8/2008 | Wanner et al. | |
| 2008/0251252 A1 | 10/2008 | Schwartz | |
| 2008/0257553 A1 | 10/2008 | Gatlin et al. | 166/280.2 |
| 2008/0257554 A1 | 10/2008 | Zamora et al. | |
| 2008/0269082 A1 | 10/2008 | Wilson, Jr. et al. | |
| 2008/0283242 A1 | 11/2008 | Ekstrand et al. | |
| 2008/0287325 A1 | 11/2008 | Thompson et al. | |
| 2008/0314124 A1 | 12/2008 | Sweeney et al. | |
| 2008/0318812 A1 | 12/2008 | Kakadjian et al. | |
| 2009/0067931 A1 | 3/2009 | Curr et al. | |
| 2009/0151959 A1 | 6/2009 | Darnell et al. | |
| 2009/0200027 A1 | 8/2009 | Kakadjian et al. | |
| 2009/0200033 A1 | 8/2009 | Kakadjian et al. | |
| 2009/0203553 A1 | 8/2009 | Gatlin et al. | |
| 2009/0250659 A1 | 10/2009 | Gatlin | 208/236 |
| 2010/0000795 A1 | 1/2010 | Kakadjian et al. | |
| 2010/0012901 A1 | 1/2010 | Falana et al. | |
| 2010/0077938 A1 | 4/2010 | Zamora et al. | |
| 2010/0122815 A1 | 5/2010 | Zamora et al. | |
| 2010/0181071 A1 | 7/2010 | van Petegen | |
| 2010/0197968 A1 | 8/2010 | Falana et al. | |
| 2010/0212905 A1 | 8/2010 | van Petegem | |
| 2010/0252262 A1 | 10/2010 | Ekstrand et al. | |
| 2011/0024361 A1 * | 2/2011 | Schwartzel | C02F 1/325 210/739 |
| 2012/0193292 A1 * | 8/2012 | Acernese | C02F 1/46109 210/660 |

FOREIGN PATENT DOCUMENTS

| | | | |
|---|---|---|---|
| GB | 775376 | 10/1954 | |
| GB | 1073338 A | 6/1967 | |
| JP | 10001461 | 6/1988 | C07C 211/50 |
| JP | 08151422 | 11/1996 | |
| JP | 10110115 A | 4/1998 | |
| JP | 2002349805 A * | 12/2002 | F22D 11/00 |
| JP | 2005194148 A | 7/2005 | |
| WO | WO 98/56497 | 12/1998 | |

OTHER PUBLICATIONS

U.S. Appl. No. 12/473,805, filed May 25, 2009, Falana et al.
European Examination Report, Oct. 2, 2011.
European Extended Examination Report, Dec. 27, 2011.

* cited by examiner

SYSTEM AND METHOD FOR SCALE INHIBITION

BACKGROUND OF THE INVENTION

1. Field of the Invention

Embodiments of the present invention relate to inhibiting scale formation or precipitate formation in oil field flow lines and processing equipment exposed to fluids containing components that form scale or precipitates on surfaces of oil field flow lines and processing equipment.

More particularly, embodiments of the present invention relate to inhibiting scale formation or precipitate formation in oil field flow lines and processing equipment exposed to fluid containing components that form scale or precipitates on surfaces of oil field flow lines and processing equipment, especially in highly paraffinic crude oils, where the method and system include applying an electric field across the fluid flowing through a flow line, where the fluid includes a scale or precipitate inhibitor and where the fluid strength and the inhibitor concentration is sufficient to reduce or prevent scale or precipitant formation. In certain embodiments, the fluid can have a desired distribution of nucleated particles produced by controlling the electric field strength and the inhibitor concentration.

2. Description of the Related Art

Chemical treatments have been used to control crystallization of waxes and to inhibit scale formation on flow lines and other oil field equipment that come in contact with fluids that include components that tend to form scale on surfaces of flow line and oil field equipment.

Many scale inhibitors have been disclosed, developed, introduced and proposed including those disclosed herein.

In addition, physical water treatments have also been disclosed. One such physical treatment utilized alternating electric fields to reduce scale formation by mass nucleation induced in a fluid due to the application across the fluid of an alternating electric field.

While chemical and physical methods for inhibiting scale have been disclosed, there mode of action are opposite. Thus, there is still a need in the art for compositions, methods and systems that inhibit scale formation in flow line and/or other oil field equipment by a combined treatment involving concurrent application of physical and chemical scale and precipitate inhibiting treatments.

SUMMARY OF THE INVENTION

Embodiments of the present invention provide a method for inhibiting scale and/or inhibiting precipitate deposition on surfaces exposed to a fluid including scale and precipitate forming components. The method includes applying an alternating electric field across a fluid, where a field strength and frequency of the alternating electric field is sufficient to inhibit scale formation in flow lines or other oil field equipment by producing a first distribution of nucleated scale forming components in the fluid. The first distribution of nucleated scale forming components includes a substantially homogeneous distribution of nucleation sites and nucleation particle sizes, where the nucleated scale forming components do not tend to form scale or deposits on surfaces of the flow line and other oil field equipment. The method also includes introducing, before, during and/or after field application, a scale inhibiting composition to the fluid, where the scale inhibiting composition is present in an amount is sufficient to produce a second distribution of nucleated scale forming components, where the second distribution includes larger and fewer nucleated sites of scale forming components in the fluid. The second distribution is less homogeneous in number and size of the resulting particles. The second distribution also reduces or inhibits scale or precipitate formation of the scale forming components in the fluid onto surfaces of the flow lines or other oil field equipment. The change or alteration in the distribution is the result of two competing affects: 1) the electric field producing nucleation sites and 2) the scale inhibitor breaking up or dispersing nucleated scale forming components. The result of the application of both the field and the scale inhibitor achieves a synergistic effect between the two inhibiting formats to produce improved scale inhibition and improved fluid flow characteristics as the fluid as less nucleation sites and the sites are not homogeneous in size.

Embodiments of the present invention provide a system for inhibiting scale formation, including a generator adapted to broadcast an alternating Rf electric field at a pipe conducting a fluid therethrough, where the pipe functions as an antenna for the Rf electric field and a fluid transmission line. The system also includes a flow line and/or a piece of oil field equipment. The flow line or piece of equipment including the two electrodes positioned so that any fluid flowing through the flow line or piece of equipment is exposed to the alternating electric field. The system also include a source of a scale inhibiting composition and a means for introducing the scale inhibiting composition into the fluid before, at and/or after the electrodes. The alternating electric field has a strength and a frequency sufficient to produce a first distribution of nucleated scale forming components in the fluid. In certain embodiment, the first distribution is substantially uniformly distributed throughout the fluid to form a fluid including a substantially homogeneous and/or uniform distribution of nucleation sites or more precisely, a substantially homogeneous and/or uniform distribution of nucleated particles of the components in the fluid that are prone to form deposits on the surfaces of flow lines or equipment. The scale inhibiting composition is present in an amount sufficient to inhibit formation of deposits on the surfaces of the flow lines or equipment and to reduce the formation of nucleation sites that are typically responsible for deposit formation and to produce a second distribution of nucleated scale forming components in the fluid, where the second distribution includes fewer and larger nucleation particles with reduced, little or no homogeneity.

Embodiments of the present invention provide a fluid having a reduced propensity to form deposits on exposed surfaces of flow lines or other equipment, where the fluid includes a scale inhibitor and a secondary distribution of nucleated scale forming components in the fluid, where the distribution has reduced scale forming propensity. The distribution is produced by exposing the fluid to an alternative electric field sufficient to produce a primary distribution of nucleated scale forming components in the fluid. The scale inhibitor is present in an amount sufficient to convert the primary distribution of nucleated scale forming components into the secondary distribution of nucleated scale forming components. The primary distribution of nucleated scale forming components includes a substantially homogeneous distribution of nucleation sites and a substantially uniform distribution of nucleated particles in the fluid. The secondary distribution of nucleated scale forming components includes fewer and large nucleated scale forming components and reduce, little or no particle size homogeneity.

Embodiments of the present invention provide a fluid having a desired distribution of nucleated particles, where the fluid includes a scale inhibitor and has been exposed to an alternating electric field and where the amount of scale inhibitor and the field strength and frequency of the alternating electric field are sufficient to produce the desired distribution of nucleated particles.

BRIEF DESCRIPTION OF THE DRAWINGS

The invention can be better understood with reference to the following detailed description together with the appended illustrative drawings in which like elements are numbered the same.

DETAILED DESCRIPTION OF THE INVENTION

The inventor has found that compositions, methods and systems can be designed that reduce scale formation on surfaces of flow lines and/or other oil field equipment, where the systems and methods involve a combined approach utilizing a physical scale inhibiting treatment and a chemical scale inhibiting treatment. The inventor has found that these two contrarily acting treatments surprisingly form systems and methods that can effectively and efficiently reduced scale on surface of flow lines and/or equipment and produces unique fluid compositions including nucleated components that form in the fluid, but do not form irremovable scale from the surfaces of the flow lines and/or equipment in contact with the treated fluids. The surprising nature of this invention stems from the manner of action of the two treatments. Physical treatments are designed to induce mass nucleation of components in a fluid to reduce the effective amount of components that can adhere to surfaces of flow lines and/or equipment, while chemical treatments are designed to prevent the nucleation of these components in the first instant, but especially on the surface of flow lines and/or other oil field equipment.

Physical water treatment produces suspended scale particles which can act as nucleation sites for paraffin as it precipitates from cooling oil. In high paraffin environments, the sheer quantity of paraffin causes these crystallites to grow until deposits form. Chemical dispersants used as adjuncts to physical water treating devices provide a means of dispersing the oil wetted solids in the fluid environment, thus easing the problems associated with deposit formation.

This solution provides a synergy between chemical and physical approaches to organic deposit formation. Physical water treatment technology allows the production of large concentrations of nucleation sites that would be uneconomical to introduce by chemical means. Chemical dispersion of the nucleated solids extends the applicability of physical water treatment as a deposit control strategy to situations where the concentration of material that can form deposits exceeds the normal carrying capacity of the fluid.

The scale inhibitors are added to the fluid upstream of the location of the electric field generator, at the location of the electric field generator and/or downstream of the electric field generator at levels between about 1 ppm and about 500 ppm. In certain embodiments, the scale inhibitor is added at levels between about 5 ppm and about 250 ppm. In certain embodiments, the scale inhibitor is added at levels between about 5 ppm and about 200 ppm. In certain embodiments, the scale inhibitor is added at levels between about 5 ppm and about 150 ppm. In certain embodiments, the scale inhibitor is added at levels between about 5 ppm and about 100 ppm. In addition, the frequency of the electric field is between about 20 kHz and about 1 MHz. In other embodiments, the frequency is between about 50 kHz and about 500 kHz. In other embodiments, the frequency is between about 50 kHz and about 200 kHz. The electric field generator system establishes a radio frequency electrical signal. In certain embodiments, the electrical signal is of a square wave form or sinusoidal, or possibly other wave forms may be utilized. The electric field strength is sufficient to produce a substantially uniformly distributed of nucleation sites throughout a fluid to form a fluid including a substantially homogeneous and/or uniform distribution of nucleation sites or more precisely, a substantially homogeneous and/or uniform distribution of nucleated particles of the components in the fluid that are prone to form deposits on the surfaces of flow lines or equipment.

Embodiments of the present invention broadly relates to a method for inhibiting scale and/or inhibiting precipitate deposition on surfaces exposed to a fluid including scale and precipitate forming components. The method includes applying an alternating electric field across the fluid, where a field strength and frequency of the alternating electric field is sufficient to inhibit scale formation in flow lines or other oil field equipment by producing a first nucleation distribution comprising a substantially homogeneous distribution of nucleation sites of scale forming components in the fluid that tend deposit on surfaces of flow lines and other oil field equipment. The method also includes introducing, before, during or after field application, a scale inhibiting composition to the fluid, where the scale inhibiting composition is present in an amount is sufficient to alters the reduce the nucleation and precipitate formation and to reduce the deposition of scale forming components in the fluid onto surfaces of the flow lines or other oil field equipment.

Embodiments of the present invention broadly relate to a system for inhibiting scale formation, including a generator adapted to broadcast an alternating Rf electric field at a pipe conducting a fluid, where the pipe functions as an antenna for the Rf electric field and transmission line. The system also includes a flow line and/or a piece of oil field equipment. The flow line or piece of equipment including the two electrodes positioned so that any fluid flowing through the flow line or piece of equipment is exposed to the alternating electric field. The system also include a source of a scale inhibiting composition and a means for introducing the scale inhibiting composition into the fluid before, at and/or after the electrodes. The alternating electric field has a strength and a frequency sufficient to promote nucleation of components in the fluid that tend to form deposits on surfaces of the flow line or piece of equipment. In certain embodiment, the nucleation is substantially uniformly distributed throughout the fluid to form a fluid including a substantially homogeneous and/or uniform distribution of nucleation sites or more precisely, a substantially homogeneous and/or uniform distribution of nucleated particles of the components in the fluid that are prone to form deposits on the surfaces of flow lines or equipment. The scale inhibiting composition is present in an amount sufficient to inhibit formation of deposits on the surfaces of the flow lines or equipment and to reduce the formation of nucleation sites that are typically responsible for deposit formation.

Embodiments of the present invention provide a fluid having a reduced propensity to form deposits on exposed surfaces of flow line or other equipment, where the fluid includes a scale inhibitor and a distribution of nucleated components with reduced scale forming propensity, where the scale inhibitor is present in an amount sufficient to reduce deposit formation on surfaces of the flow line and where the fluid has been exposed to an alternating electric field sufficient to prompt a desired level of substantially homogeneous nucleation sites in the fluid and where the scale inhibitor and the alternating electric field cooperate to produce the distribution of nucleated components.

Embodiments of the present invention provide a fluid having a desired distribution of nucleated particles, where the fluid includes a scale inhibitor and has been exposed to an alternating electric field and where the amount of scale inhibitor and the field strength and frequency are sufficient to produce the desired distribution of nucleated particles.

Suitable Reagents and Equipment

Scale inhibiting compositions for using in the practice of this invention include, without limitation, chelating agents such as formic acid, acetic acid, lactic acid, malic acid, maleic acid, tartaric acid, citric acid, hydroxyethyliminodiacetic acid (HEIDA), trimethyl-aminetricarboxylic acid (NTA), Hydroxy Ethyl Ethylene Diamine Tri Acetic acid (HEDTA), ethylenediaminetetraacetic acid (EDTA), trans-1,2-diaminocyclohexane tetraacetic acid (CyDTA), 1,4,7,10-tetraazacyclododecane-N,N'',N''',N'''-tetraacetic acid (DOTA), amino-polycarboxylic acid, diethylene triaminopentamethylenephosphonic acid, aminotrimethylene phosphonic acid, and mixtures or combinations thereof, crown ethers such as 1,10 bis(phosphonomethyl)-1,10-diazo-4,7,13,16 tetraoxacyclooctadecane, 1,10 bis(phosphinico (alpha-methyl))-1,10-diazo-4,7,13,16-tetraoxacyclooctadecane, and mixtures or combinations thereof, glyoxylic acid, cinnamaldehyde, mineral acids, hexadecyl succinic anhydride, oleic imidazoline, benzyldimethyl hexadecylammonium chloride, cetyl amine, folic acid, phosphonic acids e.g., 1-Hydroxy Ethylidene-1,1-Diphosphonic Acid (HEDPA) and diethylenetriamine penta (methylene phosphonic acid) (DTPMPA), Alpha beta poly-aspartate, carboxymethyl succinic acid, polytartaric acid, o-succinyl gluconic acid, o-succinyl saccharic acid, polyamino acids, phosphono carboxylates (POCA, PBCA), sulfonic acids e.g. PESA, polyacrolein, humic acids, Fulvic acids, Carboxymethyl inulin, vinylidene diphosponic acid, HEDPA, 2-phosphonabutane-1,2,4 tricarboxylic acid, boric acid, dendimers, and mixtures or combinations of any of the above listed scale inhibitors. Addition scale inhibitors include those disclosed in U.S. Pat. Nos. 3,931,038, 3,947,341, 3,965,003, 3,965,027, 3,966,630, 3,976,589, 3,981,740, 3,981,779, 4,008,164, 4,032,460, 4,079,006, 4,088,574, 4,255,259, 4,306,991, 4,342,652, 4,455,235, 4,476,930, 4,485,874, 4,495,996, 4,566,973, 4,590,996, 4,617,129, 4,673,508, 4,680,124, 4,741,400, 4,779,679, 4,784,774, 4,787,455, 4,799,995, 4,857,205, 4,860,829, 4,913,822, 4,931,189, 5,002,126, 5,023,001, 5,090,479, 5,112,496, 5,141,655, 5,160,630, 5,221,487, 5,263,539, 5,263,541, 5,277,823, 5,294,371, 5,298,221, 5,306,429, 5,360,550, 5,399,270, 5,604,185, 5,616,278, 5,755,971, 5,788,857, 5,858,245, 6,162,391, 6,232,419, 6,929,749, 6,949,193, 6,998,092, 7,122,148, 7,147,768, and 7,332,459, as set forth in the last paragraph all patents or articles listed in this document are expressly incorporated by reference as are these.

Flow line and oil field equipment protected by the methods of this include, without limitation, production equipment, transmission lines, separators, any other pre-refinery flow lines or equipment and mixtures or combinations thereof.

For further detail on a unit to generate an alternating electric field across a flow line or a piece of equipment through which a fluid flows can be found in US Pub. No. 20080185328, filed Aug. 7, 2008 to Daniel Stefanini, bearing Ser. No. 11/793,706, filed Dec. 18, 2007 nationalized from PCT/GB05/04944 371, filed Dec. 20, 2005 (which is incorporated by reference as are all other references as set forth in the final paragraph of the specification before the claims). The field frequencies are between about 20 kHz and about 1 MHz. In other embodiments, the frequency is between about 50 kHz and about 500 kHz. In other embodiments, the frequency is between about 50 kHz and about 200 kHz.

DETAILED DESCRIPTION OF SYSTEMS OF THIS INVENTION

Figures 1A, 1B:
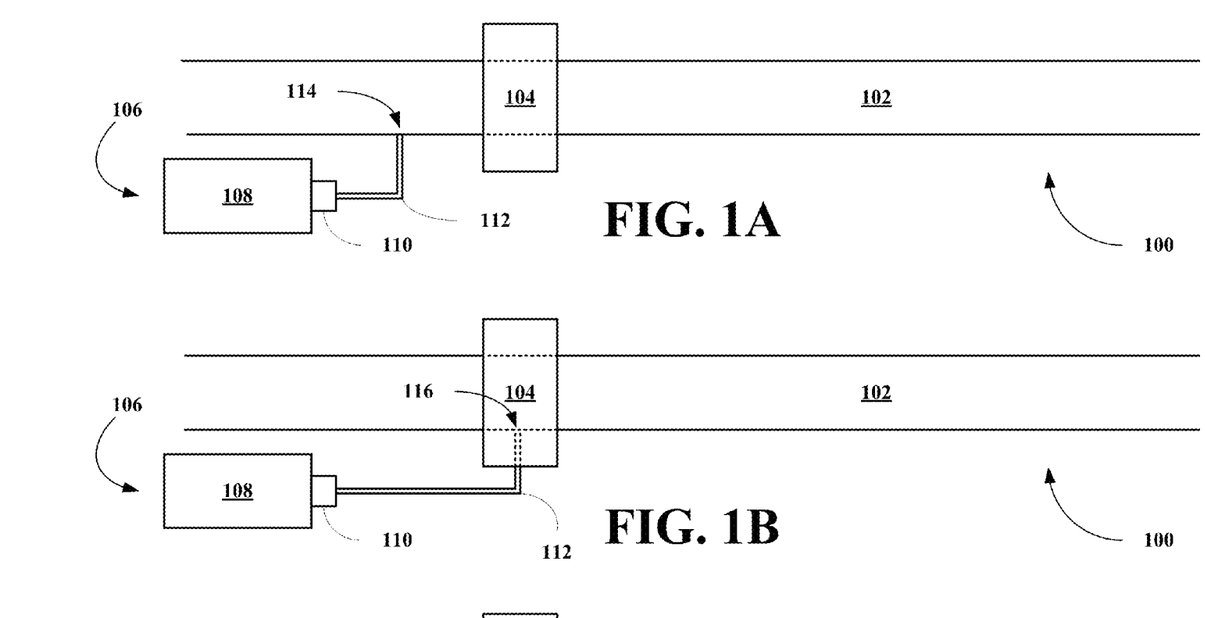
FIG. 1A depicts an embodiment of a system of this invention for scale control in a flow line.
FIG. 1B depicts another embodiment of a system of this invention for scale control in a flow line.

Referring now to FIG. 1A, an embodiment of a system for preventing scale and precipitate depositions of this inventions, generally 100, is shown to include a flow line 102. Although a flow line is used in this embodiment, the flow line can be any line or equipment that is in contact with a fluid having components that can form scale and/or deposits on surfaces of the line or equipment. The system 100 also include an alternating electric field generating apparatus 104. The system 100 also include a scale inhibitor introduction assembly 106 including an inhibitor reservoir 108 and an injector 110. The injector 110 is connected to the flow line 102 via an injection conduit 112 at a position 114 upstream from the field generating apparatus 104. In this configuration, the scale inhibitor is present in the fluid before the fluid is exposed to the alternating electric field.

Referring now to FIG. 1B, another embodiment of a system for preventing scale and precipitate depositions of this inventions, generally 100, is shown to include a flow line 102. Although a flow line is used in this embodiment, the flow line can be any line or equipment that is in contact with a fluid having components that can form scale and/or deposits on surfaces of the line or equipment. The system 100 also include an alternating electric field generating apparatus 104. The system 100 also include a scale inhibitor introduction assembly 106 including an inhibitor reservoir 108 and an injector 110. The injector 110 is connected to the flow line 102 via an injection conduit 112 at a position 116 coincident with the field generating apparatus 104. In this configuration, the scale inhibitor is introduced into the fluid during the exposure of the fluid to the alternating electric field.

Figure 1C:
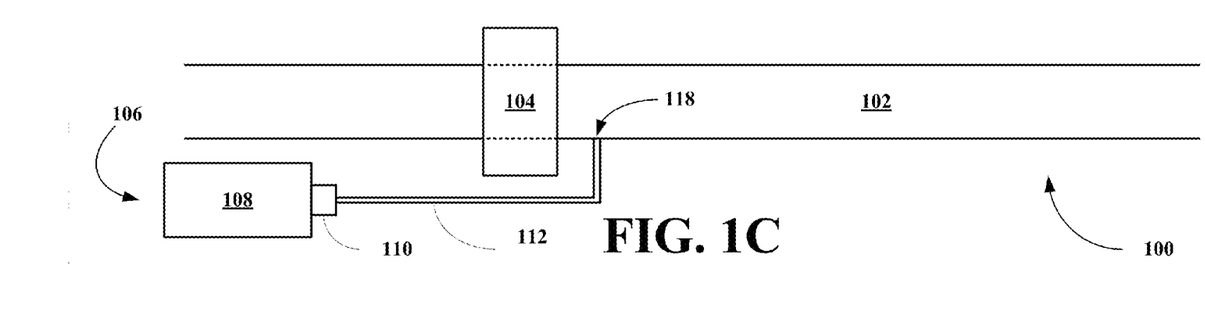
FIG. 1C depicts another embodiment of a system of this invention for scale control in a flow line.

Referring now to FIG. 1C, another embodiment of a system for preventing scale and precipitate depositions of this inventions, generally 100, is shown to include a flow line 102. Although a flow line is used in this embodiment, the flow line can be any line or equipment that is in contact with a fluid having components that can form scale and/or deposits on surfaces of the line or equipment. The system 100 also include an alternating electric field generating apparatus 104. The system 100 also include a scale inhibitor introduction assembly 106 including an inhibitor reservoir 108 and an injector 110. The injector 110 is connected to the flow line 102 via an injection conduit 112 at a position 118 downstream from the field generating apparatus 104. In this configuration, the scale inhibitor is introduced into the fluid during the exposure of the fluid to the alternating electric field.

Figure 1D:
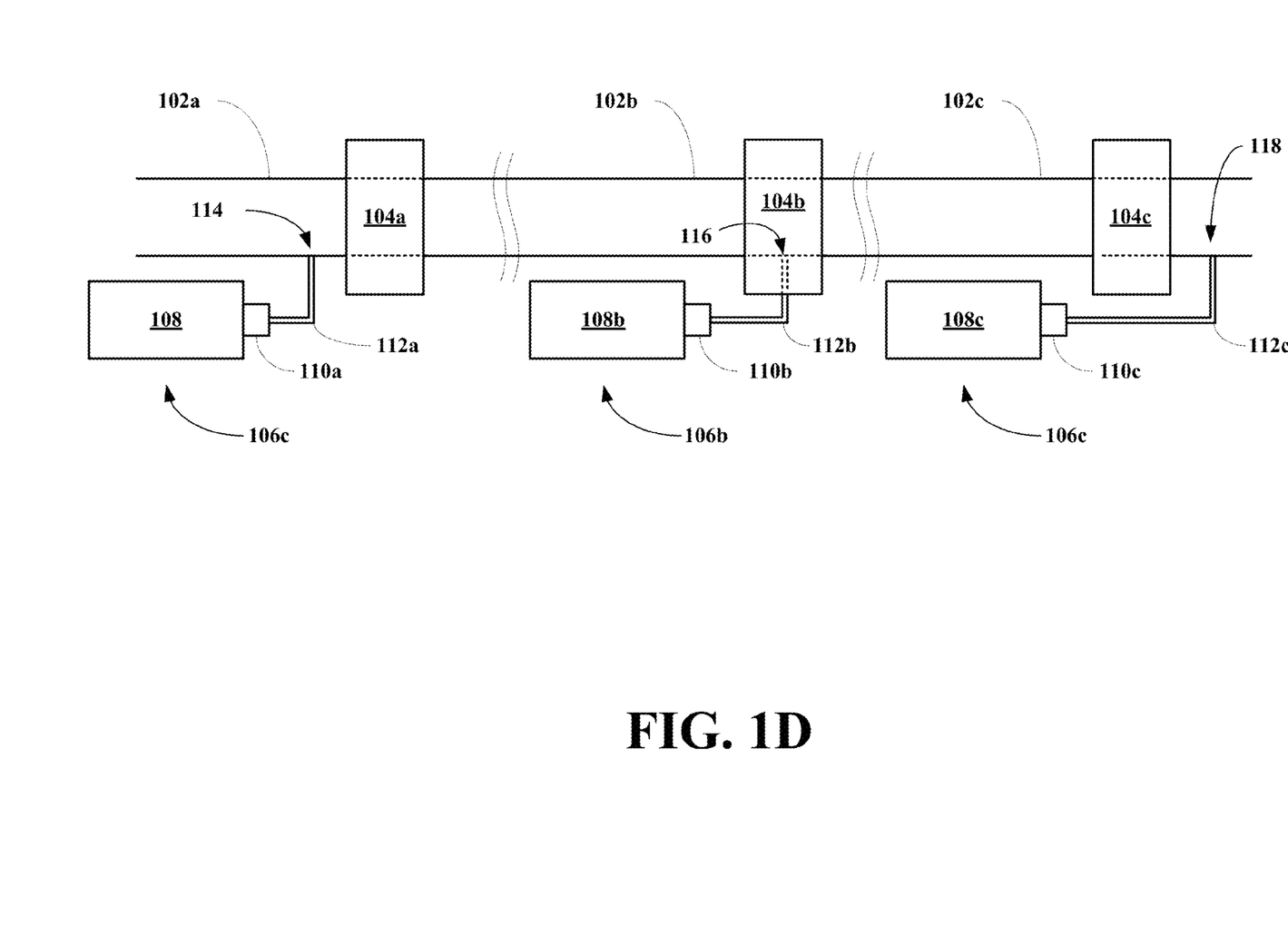
FIG. 1D depicts an embodiment of a system of this invention for scale control in a flow line having multiple physical scale control units and multiple chemical scale inhibitor injection sites.

Referring now to FIG. 1D, another embodiment of a system for preventing scale and precipitate depositions of this inventions, generally 100, is shown to include flow lines 102a-c. Although a flow line is used in this embodiment, the flow line can be any line or equipment that is in contact with a fluid having components that can form scale and/or deposits on surfaces of the line or equipment. The system 100 also include three alternating electric field generating apparatuses 104a-c. The system 100 also include three scale inhibitor introduction assemblies 106a-c, each including an inhibitor reservoir 108a-c and an injector 110a-c. The injector 110a is connected to the flow line 102 via an injection conduit 112a at a position 114 upstream from the field generating apparatus 104a. The injector 110b is connected to the flow line 102 via an injection conduit 112b at a position 116 coincident with the field generating apparatus 104b. The injector 110c is connected to the flow line 102 via an injection conduit 112c at a position 118 downstream from the field generating apparatus 104c. In this configuration, the system includes multiple generators and multiple scale injector assemblies. It should be recognized that the placement of these systems are designed to ensure continued reduction in scale and precipitate formation. It should also be recognized that the three scale introduction assemblies can be a single system feeding a single inhibitor, two feed to different inhibitors or three feeding three different inhibitors. It should also be recognized that although the system is illustrated with a flow line, the individual systems can be associated with flow lines or other oil field equipment through which fluids flow that are capable of forming scale.

Experiments of the Invention

Laboratory studies were undertaken to study treatments of flow lines in contact with production fluids such as seawater and brine compositions representative of production fluids found in the North Sea, where the treatments include chemical and physical fluid treatments. The studies were designed to test the effectiveness and efficacy of coupled physical and chemical treatments in alleviating barium scale or other scale forming problems such as wave precipitation or crystallization.

The physical treatment methodology utilized herein includes the application of an alternating current generated, electrical field across the fluid in a flow line to induce nucleation of scale forming compounds in a supersaturated aqueous fluid. The seed crystals produced by this nucleation grow depleting a concentration of ions or crystallizeable components in the supersaturated fluid without restricting fluid flow. In the absence of applied electric field, crystals nucleate and grow at vessel surfaces and impede fluid flow in flow line and/or other oil field equipment.

CONCLUSIONS

These laboratory experiments clearly establish the efficacy of methods, systems and apparatuses using an alternating current generated, electrical field in conjunction with scale inhibiting compositions to reduce scale formation in production fluids and to keep the scale forming materials in the flowing fluid rather than forming coating or deposits on pipe, flow line or other equipment surfaces. Microscopic photographs of the deposits formed when exposing the fluids to an alternating current generated, electrical field show that the material precipitated from the fluid is only loosely associated with the test pipe surface. Crystals that settle in the test fixture under low turbulence flow conditions found in the test systems would be expected to remain suspended in the fluid under turbulent flow conditions typically found in production systems.

The results obtained using a combined treatment protocol using both a chemical treatment and a physical treatment indicated that the two treatment strategies are compatible. The chemical treatment involves the use of chemical scale inhibitors. The chemical scale inhibitor functions by blocking nucleation sites in the fluid (i.e., inhibits nucleation), while the physical treatment function by creating a nucleation sites in the fluid (e.g., a homogeneous distribution of nucleation sites). The chemical scale inhibitors function in this manner (blocking nucleation) both on pipe walls and on homogeneously nucleated crystals. Their activity was evidenced by a reduction in overall precipitate with increasing inhibitor concentration. It was also shown that when both the field generating apparatus was operating and the inhibitor was present, large crystals formed in the fluid. As inhibitor concentration fell, the formation of these large crystals in the fluid decreased even as overall precipitate increased. In both instances, the precipitate was formed in the fluid, so that the solid material that did collect on surfaces of the pipe could be removed without chemical treatment. This behavior was consistent with the mechanism of action of each treatment methodology. However, the fact that the two treatment methodologies worked cooperatively to efficiently reduce scale formation was surprising resulting in the formation of a completely new type of nucleated fluid composition effective in reducing scale formation in flow line and other oil field equipment.

The implication of these experiments with the chemical scale inhibitors is that; the field generator produces seed crystals in suspension that are not completely blocked by the inhibitor. These unblocked seed crystals, then grow larger than those that form in the absence of a scale inhibitor. However, surprisingly, the combined treatment produces less total precipitate. Without exposure of the fluid to the alternating electric field produced by the field generator, the material that remains would precipitate later (as the inhibitor effect is reduced) in downstream equipment (separators transmission pipes etcetera).

From these experiments, it was concluded that in a well; if the field generator is used without inhibitors, all the material that can precipitate, is precipitated before the separators, where it can easily be removed without further chemical treatment. It was further concluded that mixing a chemical scale inhibitor treatment with the field generator treatment produced a system well suited for scale control. It was further noted that when the concentration of the inhibitor is high, the field ensures that all the material that may precipitate downstream is prevented from doing so. And this effect increased as the inhibitor concentration was reduced.

Discussion

Figure 2:
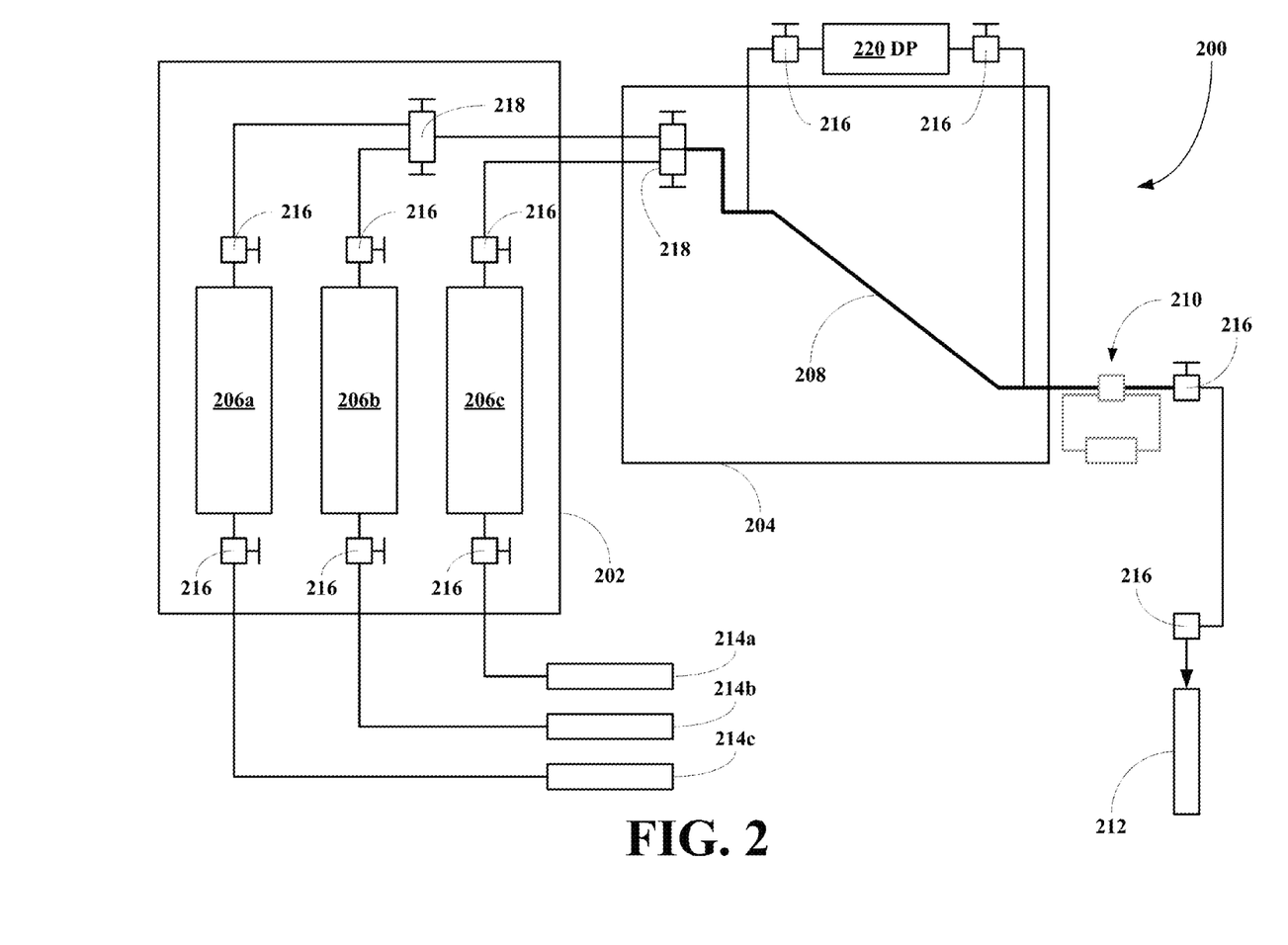
FIG. 2 depicts schematic of a scale test apparatus used to test a combined physical and chemical scale inhibition methodology.

Referring now to FIG. 2, a flow system, generally 200, was used to perform the experiments and included a first oven 202 and a second oven 204. The first oven 202 included three fluid reservoirs 206a-c disposed inside the oven 202 so that the fluids in the reservoirs 206a-c were be keep at a desired elevated temperature. The second oven 204 include a test conduit 208. The system 200 also includes a physical treatment apparatus 210. The system also included a volumetric collection vessel 212. The system also included fluid pumps 214a-c, flow control valves 216, mixing and flow control valves 218 and a DP unit 220.

The injection pumps 214a-c were capable of producing flow rates up to 3000 mL/hr and the upper system pressure of the units was 1500 psi. All tests were performed using preheated fluids. The fluids used were composed of a brine having the composition set forth in Table 1 and/or seawater having the composition set forth in Table 2. The fluids optionally included a pre-heated inhibitor solutions.

TABLE 1

Brine Recipe for 1 liter of Fluid at pH = 6

| Component | mg | Component | mg |
|---|---|---|---|
| $Na_2SO_4$ | 0.0 | NaCl | 123373.4 |
| $MgCl_2*6H_2O$ | 14959.8 | $NaHCO_3$ | 176.2 |
| $SrCl^2*6H2O$ | 5118.2 | $Na_2CO_3$ | 0.0 |
| $BaCl_2$ | 1394.7 | $NaAc*3H_2O$ | 251.19 |
| $CaCl_2*H2O$ | 74096.9 | $FeCl_2*4H_2$ | 0.0 |
| KCl | 920.9 | | |
| | TDS Analysis | | 193602.00 |
| | TDS Recipe | | 192010.73 |
| | delta TDS | | −1591.27 |

TABLE 2

Sea Water Recipe for 1 liter at pH = 7.9

| Component | mg | Component | mg |
|---|---|---|---|
| $Na_2SO_4$ | 4113.6 | NaCl | 24520.3 |
| $MgCl_2*6H_2O$ | 11063.1 | NaHCO3 | 201.0 |
| $SrCl_2*6H_2O$ | 24.3 | $Na_2CO_3$ | 0.0 |
| $BaCl_2$ | 0 | NaAc*3H2O | 0.0 |
| $CaCl_2*2H_2O$ | 1548 | FeCl2*4H2O | 0.0 |
| KCl | 781.7 | | |

Depending on the fluid to be used, the appropriate fluid was pumped into a mixing valve and then injected into an appropriate test conduit. DP measurements and pump pressure measurements were recorded manually throughout the test. Test 1 was used to check the flow system for leaks.

Tests 2-4

Tests 2-4 were performed using a test fixture that contained a 20 foot long flow line, which was covered with a plastic tube to prevent unwanted electrical contacts. This flow path also contained short (4") detachable test coupons, which were tared prior to testing.

After each test, the test coupons were rinsed with distilled water, dried and weighed to determine a mass of deposit formed during the test. Test 2 was performed with the physical treatment unit turned OFF. Test 3 was performed with the physical treatment unit turned ON. Test 4 was performed with the physical treatment unit turned ON, but using the test coupons previously used in Test 2. Test 4 was designed to measure the effect of the physical treatment unit on a previously scaled coupon. The flow conditions in these test were 200 mL/hr total volume. The tests started with 200 mL/hr flow of seawater alone for 1 hr. This was followed by a 3 hr period, where the flow of a fluid comprising 30% brine and 70% seawater at individual flow rates of 60 mL/hr of the brine and 140 mL/hr of the seawater. The test coupons were then removed for distilled water rinsing, drying and weighing. Results for this phase of testing are tabulated in Table 3.

TABLE 3

Results for Tests 2-4

| | INJ. Coupon Mass (g) | INJ. Coupon Mass (g) | Difference (g) | Prod. Coupon Mass (g) | Prod. Coupon Mass (g) | Difference (g) |
|---|---|---|---|---|---|---|
| Test 2 | 33.835 | 33.8761 | 0.0410 | 34.2679 | 34.2987 | 0.0308 |
| Test 3 | 34.205 | 34.2291 | 0.0241 | 34.1683 | 34.1685 | 0.0002 |
| Test 4 | 33.8761 | 33.8773 | 0.0012 | 34.2987 | 34.2705 | −0.0282 |

The mass adsorbed by the test coupons in Test 2 totaled 0.0718 g and those of the test coupons in Test 3 totaled 0.0242 g. This difference was significant, but in Test 3 there was a possibility that the physical treatment unit had been inadvertently turned OFF during a portion of the experiment. The results of Test 4 showed little, if any more deposit on the test coupons.

Figure 3A:
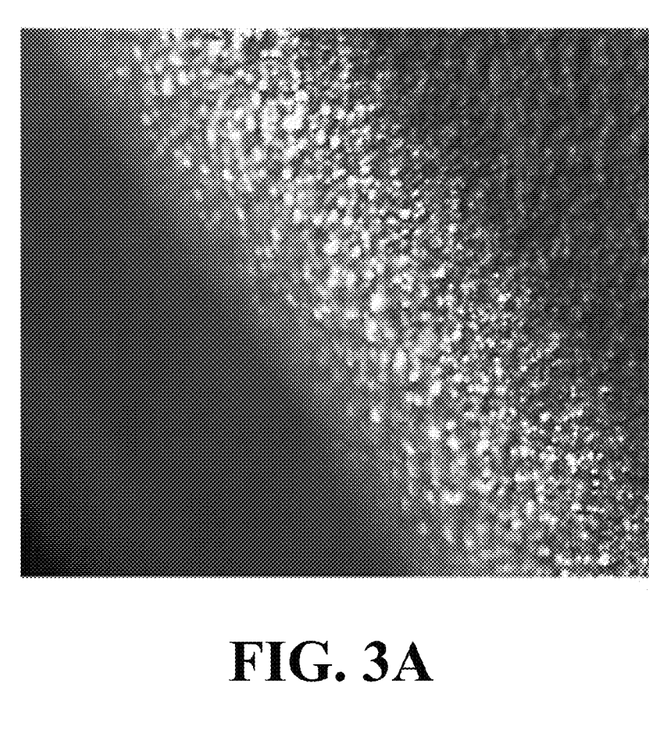
FIGS. 3A&B depict photographs of scale deposits formed on the test flow line with and without physical fluid treatment.
Figure 3B:
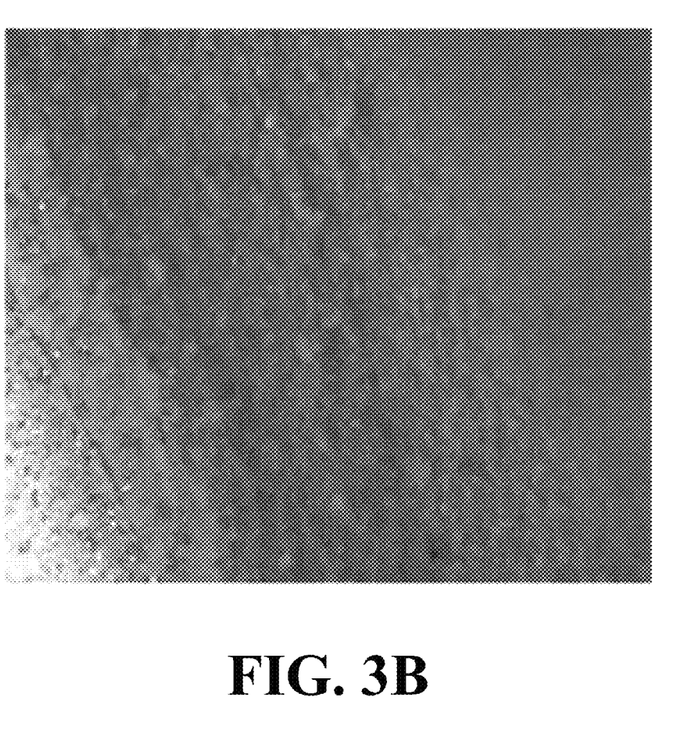

After the experiment, the surfaces of the test coupons were milled to reveal the nature of the deposits which had formed on the surface. Photomicrographs at 60× magnification are shown of the inner tube surfaces in FIGS. 3A&B.

The coupon from Test 3 (physical treatment unit turned ON only) showed a surface with many small particles strewn loosely across the surface. The coupon from Test 4 (physical treatment unit was in an OFF condition) showed more permanent plaque like deposit on the inner tube surface.

Details of Test 2 to Test 4

Test 2 used an ⅛" Squared Coil as test flow line. A flow rate of 200 mL/hr was used to test a Coupon #2 on Injection and a Coupon #3 on Production. No coil measurements were taken and the physical treatment unit was turned OFF.

Test 3 used an ⅛" Squared Coil as test flow line. A flow rate of 200 mL/hr was used to test a Coupon #4 on injection and a Coupon #5 on Production. No coil measurements were taken and the physical treatment unit was turned ON.

Test 4 used an ⅛" Squared Coil as test flow line. A flow rate of 200 mL/hr was used to test the Coupons #2 on Injection and the Coupon #3 on Production from Test 2. No coil measurements were taken and the physical treatment unit was turned ON.

Tests 5-7

Tests 5-7 were performed using a shorter test fixture, but the mass of the entire test fixture was determined. In these tests, no separate test coupons were used; instead, a coil prepared from a 6' length of ⅛" tubing was used as the test flow line. Flow conditions were arranged to mimic those of Tests 2-4, i.e., 200 mL/hr total flow.

In this phase, Test 5 was performed with the physical treatment unit turned OFF. Test 6 was performed with a new coil with the physical treatment unit turned ON. Test 7 was performed using the pre-scaled coil of Test 5 with the physical treatment unit turned ON. Greater mass gain was clearly seen when the physical treatment unit was turned ON. The data is consistent with the increased nucleation rate associated with the use of the physical treatment unit, the hydrodynamic drag associated with the tight ⅛" coil, the density of the deposit (largely Barium scale) formed and the low flow rate used in these experiments. Results of these testing are presented in Table 4 below:

TABLE 4

Results for Experiments 5-7

|  | Coil Mass After Test (g) | Coil Mass Before Test (g) | Mass Gained (g) | Device Status |
|---|---|---|---|---|
| Test 5 | 81.030 | 80.975 | 0.055 | OFF |
| Test 6 | 82.904 | 82.746 | 0.158 | ON |
| Test 7 | 81.145 | 81.027 | 0.118 | ON |

Tests 8-10

Tests 8-10 were performed using a 6' coil formed from ¼" o.d. tubing at a total flow rate of 1200 mL/hr. The proportional flow of the brine fluid to seawater fluid was fixed as before at 30% brine flow to 70% seawater flow. The flow rate of 1200 mL/hr was chosen so that there would be a net increase in linear flow velocity accompanying the change in tube diameter. No coupons were used in these tests and the mass of the entire coil was measured before and after each flow test. The results of these tests are given in Table 5.

TABLE 5

Results for Experiments 8-10

|  | Coil Mass After Test (g) | Coil Mass Before Test (g) | Mass Gained (g) | Device Status |
|---|---|---|---|---|
| Test 8 | 244.892 | 244.713 | 0.179 | OFF |
| Test 9 | 245.595 | 245.171 | 0.424 | ON |
| Test 10 | 245.185 | 244.892 | 0.293 | ON |

These results largely support the results seen in Tests 5-7 and suggest that even greater flow rates are required to keep the nucleate suspended. In a well, the flow would be several orders of magnitudes higher and would be expected to carry the precipitate to the separators.

Tests 14-15

A series of experiments were conducted to establish practical limits to flow in the test flow line. Tests 14 and 15 were performed with quantitative deposition measurements. Test 14 was performed with the physical treatment unit turned OFF, while Test 15 was performed with the physical treatment unit turned ON. Test 14&15 were carried out using a 6' section of ¼" o.d. tubing as the test flow line wrapped around a mandrel to produce a coil. The tests also used coupons before and after the coil. The coil was weighed before the test and sacrificed after the test to obtain a visual characterization of the deposit morphology. The coil was disposed in a vertical orientation with flow proceeding from the bottom to the top to ensure that the liquid flow was not impeded by gravity.

The liquid flow rate used in Test 14&15 was 3000 mL/hr, which was the maximum flow rate achievable with the available pumps. The test protocol was: (1) 30 minutes seawater only; (2) 2 hrs mixed brine/seawater (30/70); and (3) 30 minutes DI water flush. The effluent from the mixed brine and DI water flush periods were separately collected, and immediately filtered. Tared filter papers were then brought to constant weight and the mass gain attributed to precipitate from the brine/seawater flow was determined. Results of the measurements performed during Tests 14&15 are presented in Tables 6-11.

TABLE 6

Test 14 with Physical Treatment Unit Turned OFF

|  | Coupon 6 | Coupon 7 | Coil |
|---|---|---|---|
| Before | 33.3569 | 33.4961 | 247.462 |
| After | 33.5166 | 33.5053 | 251.576 |
| Mass Gain (g) | 0.1597 | 0.0092 | 4.114 |

TABLE 7

Filter Paper Weights Before and After Test and Mass Gain

| | Brine* | | | | | | | | |
|---|---|---|---|---|---|---|---|---|---|
|  | FP1 | FP2 | FP3 | FP4 | FP5 | FP6 | FP7 | FP8 | FP9 |
| Before (g) | 0.0844 | 0.0847 | 0.0844 | 0.0843 | 0.0844 | 0.0846 | 0.0845 | 0.0841 | 0.08465 |
| After (g) | 0.9364 | 0.5452 | 0.4528 | 0.5802 | 0.6454 | 0.5844 | 0.2704 | 0.2690 | 0.2606 |
| Mass Gain (g) | 0.8520 | 0.4605 | 0.3684 | 0.4959 | 0.5610 | 0.4998 | 0.1859 | 0.1849 | 0.17595 |

*The effluent brine was filtered in stages using separate filter papers.

TABLE 8

Filter Paper Weights Before and After DI Wash and Mass Gain

| | DI | | |
|---|---|---|---|
|  | FP1 | FP2 | Total PPT Solid (g) |
| Before | 0.0846 | 0.0847 |  |
| After | 0.3076 | 0.5952 | 8.80075 |
| Mass Gain (g) | 0.2230 | 0.5105 |  |

TABLE 9

Test 15 with Physical Treatment Unit Turned ON

|  | Coupon 8 | Coupon 9 | Coil |
|---|---|---|---|
| Before | 33.4089 | 33.659 | 246.113 |
| After | 33.499 | 33.7235 | 255.044 |
| Mass Gain (g) | 0.0901 | 0.0645 | 8.931 |

TABLE 10

Filter Paper Weights Before and After Test and Mass Gain

|  | Brine | | | | DI | Total ppt |
|---|---|---|---|---|---|---|
|  | FP1 | FP2 | FP3 | FP4 | FP1 | solid (g) |
| Before | 0.0844 | 0.0844 | 0.0849 | 0.0842 | 0.0846 |  |
| After | 0.3474 | 0.4431 | 1.2552 | 1.2975 | 0.0958 |  |
| Mass Gain(g) | 0.2630 | 0.3587 | 1.1703 | 1.2133 | 0.0112 | 12.1021 |

TABLE 11

Coupon + Coil Mass Gain

| Coupon + Coil Mass Gain | |
|---|---|
| Test 14 | 4.2829 |
| Test 15 | 9.0856 |
| PPT from Brine | |
| Test 14 | 3.78435 |
| Test 15 | 3.0053 |
| PPT from DI wash | |
| Test 14 | 0.7335 |
| Test 15 | 0.0112 |

Figure 4:
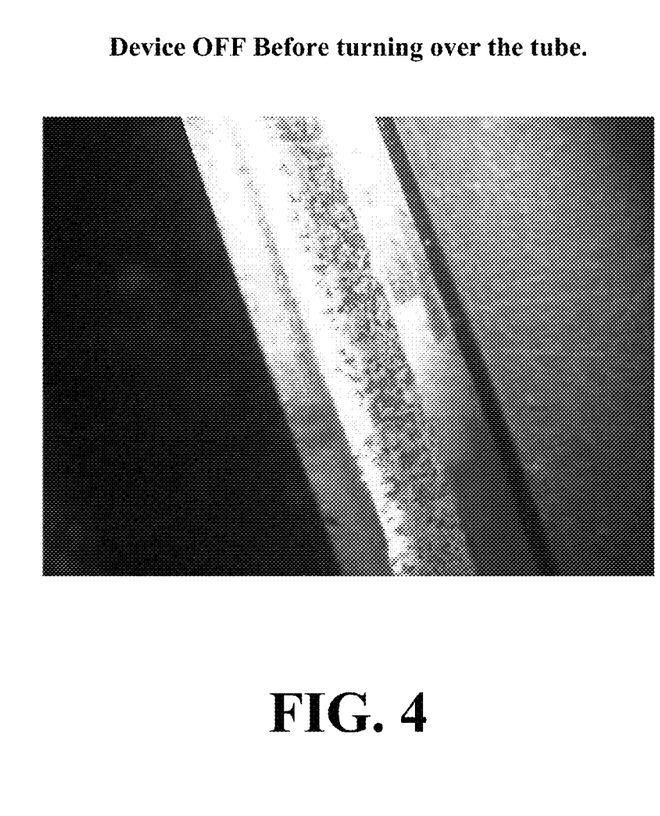
FIG. 4 depicts photograph of scale deposits formed on the test flow line without physical fluid treatment, but with scale inhibitor.
Figure 5:
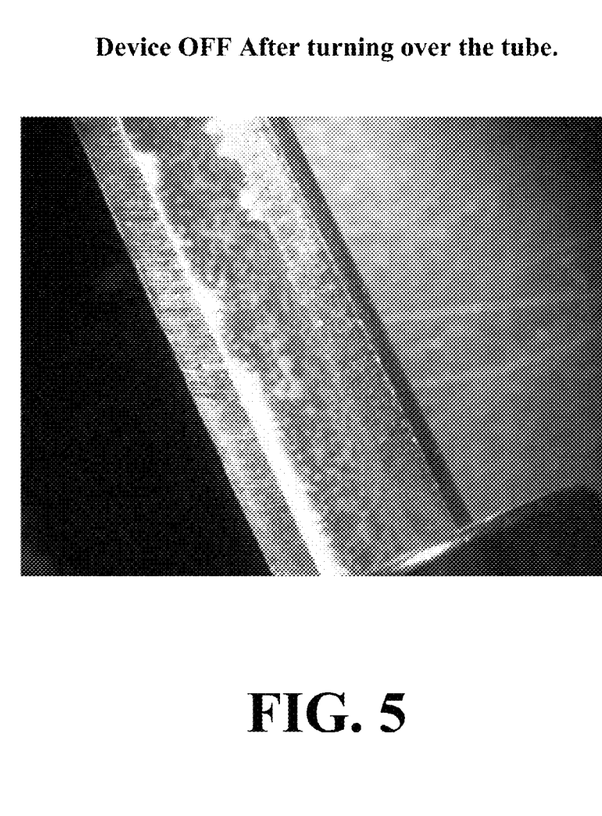
FIG. 5 depicts photograph of scale deposits formed on the test flow line without physical fluid treatment, but with scale inhibitor.

The increased deposit observed when the physical treatment unit was turned ON were still consistent with the physical treatment unit turned functioning to provide nucleation sites. The data also showed that the effluent from the test was not yet depleted in its precipitation potential when the device is not in use. There is a suggestion that the drag form the tight coil used in the Tests 14&15 magnifies the holdup of suspended particles. In order to address this potential problem, photographic characterization of the deposits produced in the test flow line were performed. The first set of photographs was obtained from a test coupon used in Test 14, where the physical treatment unit was turned OFF. Looking at FIG. 4, a photogram of the inner surface of the test coupon immediately after milling off the top of the tube is shown. Looking at FIG. 5, a photogram of the same tube after turning over the tube and allowing loose material to drop out is shown. With the physical treatment unit turned OFF, a significant fraction of the deposit remains stuck to the tube wall of the test flow line.

Figure 6:
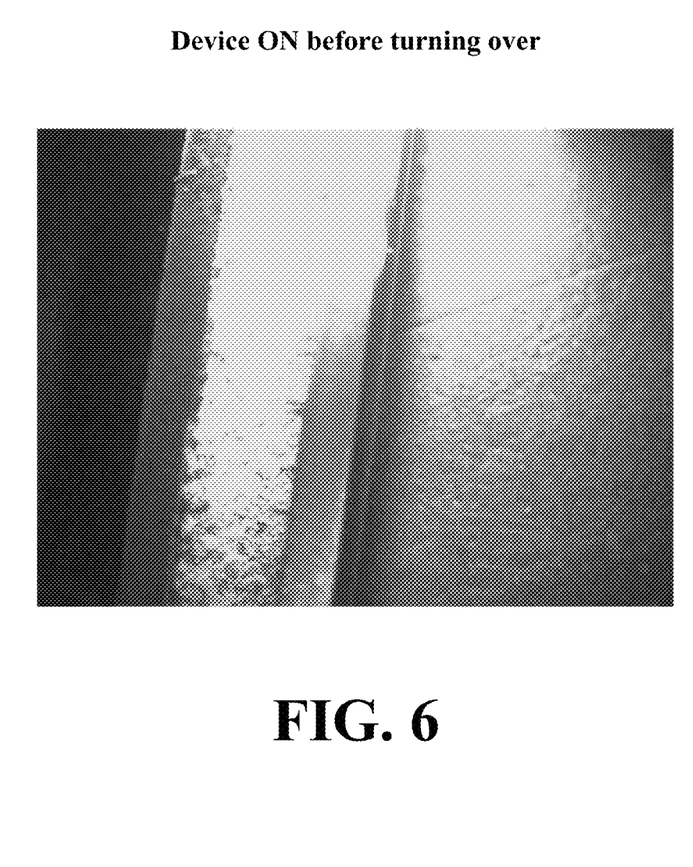
FIG. 6 depicts photograph of scale deposits formed on the test flow line with physical fluid treatment, but with scale inhibitor.
Figure 7:
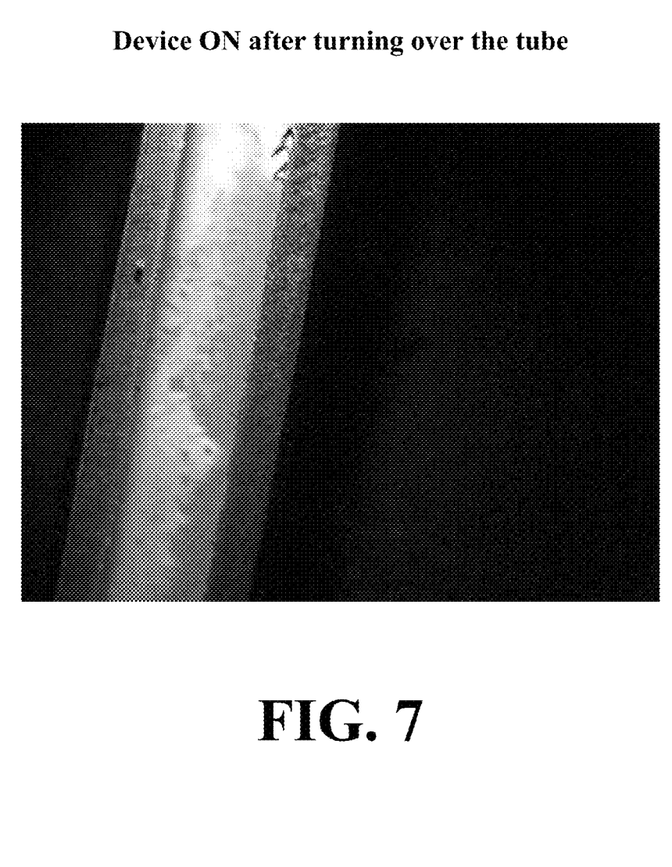
FIG. 7 depicts photograph of scale deposits formed on the test flow line with physical fluid treatment, but with scale inhibitor.

Referring now to FIG. 6 and FIG. 7, a photograms of a test coupons produced when the physical treatment unit was turned ON are shown. Looking at FIG. 6, a significant quantity of a loose white deposit is seen; this deposit has settled in the tube. Looking at FIG. 6, a considerably reduced amount of white powder is seen in the tube after inversion. A significant fraction of the inorganic deposit within this test coupon was dislodged from the tube after simply turning the tube over. Further, it was observed that there was significant accumulation of loose scale on the exit side of the test section. Immediately following this test section, the drain was attached. The drain was constructed from a ⅛" o.d. section of tubing and apparently caused substantial throttling of flow in the system.

We concluded that the gain in mass of the coil and test sections actually confirms the action of the physical treatment unit. That is, the physical treatment unit functions to increase nucleation in the supersaturated solution. The photo grams illustrate that much of the gain in weight can be attributable to loose scale. These tests show that the overall flow and drag conditions combine to cause solid accumulation in the test section.

Experiments with Inhibitor Present

Figure 8:
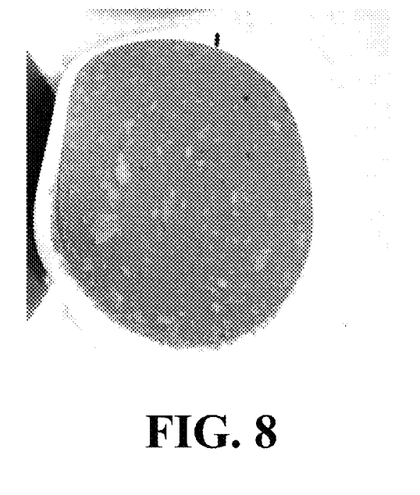
FIG. 8 depicts photograph of collected precipitate at 50 ppm inhibitor concentration. The dark circle is 25 mm diameter. There were only a few crystals obtained in this experiment.
Figure 9:
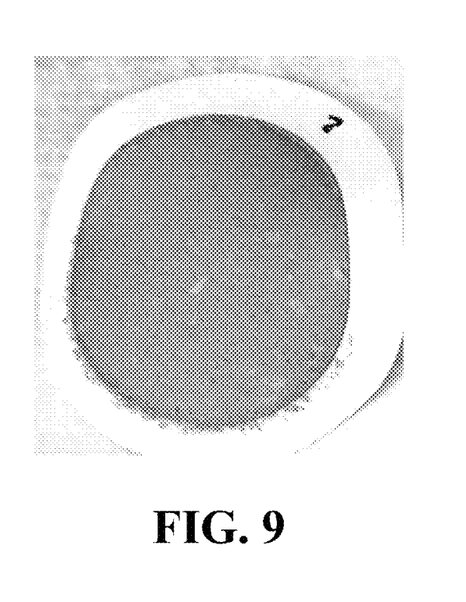
FIG. 9 depicts photograph filtered precipitate when the inhibitor concentration is 15 ppm
Figure 10:
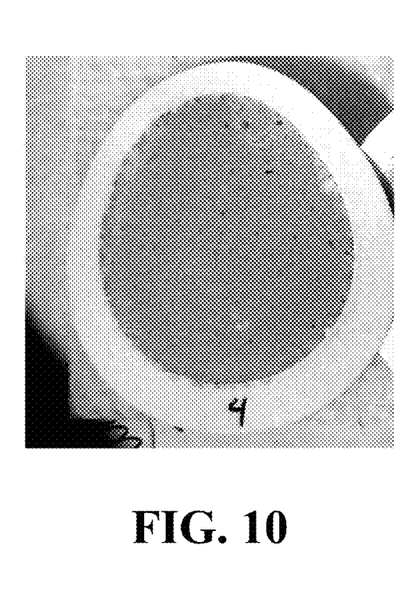
FIG. 10 depicts photograph collected precipitate when the inhibitor concentration is 5 ppm

Experiments with the inhibitor were performed in a test coupon/coil configuration as shown in FIGS. 8, 9 and 10.

In this configuration both the coil and coupon weights were determined. As well as the mass of precipitate filtered from the effluent. A scale inhibitor was provided by ConocoPhillips. A stock solution was used that contained 5000 mg/L of inhibitor.

Initial experimentation was performed at a flow rate of 1200 mL/hr of the seawater/Brine mixture was used with inhibitor added to the system beginning at 12 mL/hr for 1 hr followed by an infusion rate of 3.6 mL/hr for 1 hr and then a 1.2 mL/hr rate for 1 hr. These flow rates correspond to treatment concentrations of 50 ppm, 15 ppm and 5 ppm. The electric field generator system was on during this experiment. The effluent for each phase of this experiment was separately collected and filtered. The filtrate was stabilized by adding inhibitor and sent for chemical analysis.

The test coupons and coil weight changes were measured at the end of the test period, but the precipitate was collected from the effluent on an hourly basis. The data show that the precipitate in the effluent increases as the inhibitor concentration is reduced. This result is consistent with the position that the inhibitor acts to reduce nucleation and the electric field generator system operates by increasing overall nucleation. This conclusion is also born out by visual examination of the precipitate collected during this experiment. There are several key observations from this experiment with the chemical scale inhibitor and the electric field generator system.

The combined treatment of flow lines with electric field generator system and scale inhibitors have the following characteristics and properties: 1) with both treatments in use, as inhibitor concentration decreases, the mass of precipitate collected from the effluent increases; and 2) when both treatments are used simultaneously, photographs show that concentration of crystallites collected in the effluent increase with increased inhibitor concentration.

These results suggest that the chemical scale inhibitor functions by blocking nucleation sites that are found on pipe walls and by inhibiting growth of homogeneously nucleated crystals. Further these results can be seen as confirming the method of operation of the electric field generator system, that is, the device generates homogeneous nucleation sites within the supporting fluid. Adsorption of the inhibitor onto pipe walls would account for the increased coil weights seen relative to the blank.

An inhibitor that functions by stopping the growth of nucleated crystallites would account for observation 1. At high chemical inhibitor concentrations, most of the nucleation sites created by the electric field generator system are blocked. The few that are not blocked, grow disproportionately, but they grow in solution and are collected with the effluent. As the concentration of chemical inhibitor is decreased, the number of large crystallites decreases even as the overall quantity of precipitate increases.

TABLE 12

Test Results with Inhibitor Present

| Inhibitor concentration Mg/L | Effluent Precipitate (grams) | PreCoil coupon (grams) | PostCoil coupon (grams) | Coil Mass Added (grams) |
|---|---|---|---|---|
| 50 | 0.1435 | | | |
| 15 | 0.2251 | | | |
| 5 | 0.6737 | 0.0079 | 0.0258 | 0.661 |

Reynolds Number Calculations

Reynolds Number calculations were performed for pipe flows representative of those used in the Hycal experiments and are compared with a Reynolds number calculated for water flow at 6000 bbl/day through a 5" pipe. This flow rate is presumed to be representative of fluid flows established in working North Sea collection systems.

Calculations were performed using a web based calculator found at the efunda.com website (http://www.efunda.com/formulae/fluids/calc_reynolds.cfm#calc). This calculator required an estimate of the fluid density (kg/L) and dynamic viscosity (cP). Values of 1 kg/L and 1 cP were chosen. The Reynolds Number can be used to establish the existence of turbulent flow in a pipe. According to Wikipedia, the critical Reynolds Number to establish turbulent flow is 2300. None of the Reynolds numbers calculated for the flow experiments nears this number, but the value calculated for a 10000 bbl/day flow in a 5 inch pipe is calculated to be 185000. This discrepancy suggests that sedimentation of a precipitate will be more pronounced in the experiments than in a realistic flow regime. Because of these low flow rates in the test rig, the precipitate could only sediment. However given the faster flow rate in the oil well, all precipitate will be carried away, and would not sediment at all. Results are tabulated in Table 6 and 7.

TABLE 13

Reynolds Numbers for Laboratory Pipe Flow

| Flow Rate (mL/hr) | Reynolds Number in ⅛" Flow Line | Reynolds Number in ¼" Flow Line |
|---|---|---|
| 200 | 32.8 | 12.8 |
| 1200 | 197 | 76.6 |
| 3000 | 491 | 192 |

TABLE 14

Reynolds Number for Field Pipe Flow

| Flow Rate (bbl/day) | Reynolds Number in 5" Pipe |
|---|---|
| 10000 | 185000 |

Analysis Results for Experiments with Inhibitor Present

Effluent water was filtered and then stabilized with excess inhibitor and sent for inorganic analysis at CoreLab facility in Calgary. The following datasheets document the results of those analyses.

TABLE 15

Analysis of Effluent Water from Tests 14&15

| | 12 mL inh/hr Meq/Liter | 3.6 mL inh/hr Meq/liter | 1.2 mL inh/hr Meq/liter |
|---|---|---|---|
| Cations | | | |
| Na | 980.4 | 1018.7 | 1070.0 |
| K | 18.9 | 19.7 | 20.5 |
| Ca | 383.7 | 413.7 | 441.6 |
| Mg | 117.7 | 118.5 | 119.3 |
| Ba | 0.4 | 0.3 | 0.1 |
| Sr | 16.3 | 17.6 | 18.4 |
| Fe | — | — | — |
| Mn | 0.0 | 0.0 | 0.0 |
| Anions | | | |
| Cl | 1507.9 | 1586.2 | 1654.5 |
| Br | — | — | — |
| I | — | — | — |
| $HCO_3$ | 1.9 | 1.6 | 1.8 |
| $SO_4$ | 36.6 | 31.6 | 31.6 |
| $CO_3$ | 0.0 | 0.0 | 0.0 |
| OH | 0.0 | 0.0 | 0.0 |
| $H_2S$ | — | — | — |
| pH | 7.2 | 7.1 | 7.1 |

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method for inhibiting scale and/or inhibiting precipitate deposition comprising:
   applying an alternating Rf electric field across an aqueous fluid including scale forming components flowing through flow lines, pipes, and/or equipment, where a field strength and frequency of the alternating Rf electric field is sufficient to nucleate the scale forming components to produce a first distribution of particles of the scale forming components in the fluid, where the first distribution is homogeneous and uniform, and
   introducing, before, during or after field application, a scale inhibiting composition to the fluid flowing through the flow lines, pipes, and/or equipment, where the scale inhibiting composition is present in an amount sufficient to produce a second distribution of particles of the scale forming components in the fluid, where the scale inhibiting composition comprises a chelating agent, a crown ether, a mineral acid, a phosphonic acid, a phosphino carboxylate, a sulfonic acid, cinnamaldehyde, or mixtures and combinations thereof, where the second distribution includes a smaller number of larger particles compared to the particles of the first distribution, where the larger particles have reduced or no size uniformity and where the particles in the second distribution have a reduced scale forming propensity or reduced propensity for forming deposits on surfaces of the flow lines, pipes, and/or equipment than the propensities of the scale forming components in the absence of the scale inhibiting composition.

2. The method of claim 1, wherein the amount of the scale inhibiting composition is sufficient to result in a scale inhibiting composition concentration between about 1 ppm and about 500 ppm and wherein the alternating Rf electric field frequency is between about 20 kHz and about 1 MHz.

3. The method of claim 1, wherein the amount of the scale inhibiting composition is sufficient to result in a scale inhibiting composition concentration between about 5 ppm and about 250 ppm and wherein the alternating Rf electric field frequency is between about 50 kHz and about 500 kHz.

4. The method of claim 1, wherein the amount of the scale inhibiting composition is sufficient to result in a scale inhibiting composition concentration between about 5 ppm and about 200 ppm and wherein the alternating Rf electric field frequency is between about 50 kHz and about 200 kHz.

5. The method of claim 1, wherein the amount of the scale inhibiting composition is sufficient to result in a scale inhibiting composition concentration between about 5 ppm and about 150 ppm and wherein the alternating Rf electric field frequency is between about 50 kHz and about 200 kHz.

6. The method of claim 1, wherein the amount of the scale inhibiting composition is sufficient to result in a scale inhibiting composition concentration between about 5 ppm and about 100 ppm and wherein the alternating Rf electric field frequency is between about 50 kHz and about 200 kHz.

7. The method of claim 1, wherein the scale inhibiting composition is selected from the group consisting of formic acid, acetic acid, lactic acid, malic acid, maleic acid, tartaric acid, citric acid, 2-hydroxyethyliminodiacetic acid (HEIDA), nitrilotriacetic acid (NTA), hydroxyethyenediaminetriacetic acid (HEDTA), ethylenediaminetetraacetic acid (EDTA), trans-1,2-diaminocyclohexane-N,N,N',N'-tetraacetic acid, monohydrate (CyDTA), 1,4,7,10-tetraazacyclododecane-1,4,7,10-tetraacetic acid (DOTA), amino-polycarboxylic acid, diethylene triaminopentamethylenephosphonic acid, aminotrimethylene phosphonic acid, 1,10-bis(phosphonomethyl)-1,10-diazo-4,7,13,16-tetraoxacyclooctadecane, 1,10-bis(phosphinico(alpha-methyl))-1,10-diazo-4,7,13,16-tetraoxacyclooctadecane, glyoxylic acid, hexadecyl succimic anhydride, oleic imidazoline, benzyldimethyl hexadecylammonium chloride, cetyl amine, folic acid, 1-hydroxy ethylidene-1,1-diphosphonic acid (HEDP A), diethylenetriamine penta(methylene phosphonic acid) (DTPMP A), alpha beta poly-aspartate, carboxymethyl succinic acid, polytartaric acid, o-succinyl gluconic acid, o-succinyl saccharic acid, polyamino acids, poly(octanediol-co-citrate) (POCA), 2-phosphonobutane-1,2,4-tricarboxylic acid (PBCA), polyepoxysuccinic acid (PESA), polyacrolein, humic acids, fulvic acids, carboxymethyl inulin, vinylidene diphosponic acid, 2-phosphonabutane-1,2,4-tricarboxylic acid, boric acid, dendimers, and mixtures or combinations.

8. A method for inhibiting scale and/or inhibiting precipitate deposition comprising:
applying an alternating Rf electric field across an aqueous fluid including scale forming components flowing through flow lines, pipes, and/or oil field equipment in the presence of an effective amount of a scale inhibiting composition comprising a chelating agent, a crown ether, a mineral acid, a phosphonic acid, a phosphino carboxylate, a sulfonic acid, cinnamaldehyde, or mixtures and combinations thereof, and
forming a secondary particle size distribution of nucleated particles of the scale forming components in the fluid via a synergistic effect of applying the alternating Rf electric field across the fluid in the presence of the scale inhibiting composition characterized in that the applied alternating electric field has a field strength and frequency sufficient to nucleate the scale forming components into a primary particle size distribution comprising homogeneous or uniform particles and the scale inhibiting composition is present in an amount sufficient to convert the primary particle size distribution into the secondary particle size distribution comprising a smaller number of larger particles having reduced size uniformity or no size uniformity,
where the distribution achieved by the synergistic effect improves scale inhibition and improves fluid flow characteristics as the fluid has fewer nucleated particles and the particles are not homogeneous or uniform in size.

9. The method of claim 8, wherein the amount of the scale inhibiting composition is sufficient to result in a scale inhibiting composition concentration between about 1 ppm and about 500 ppm and wherein the alternating Rf electric field frequency is between about 20 kHz and about 1 MHz, or a scale inhibiting composition concentration between about 5 ppm and about 250 ppm and wherein the alternating Rf electric field frequency is between about 50 kHz and about 500 kHz, or a scale inhibiting composition concentration between about 5 ppm and about 200 ppm and wherein the alternating Rf electric field frequency is between about 50 kHz and about 200 kHz, or a scale inhibiting composition concentration between about 5 ppm and about 150 ppm and wherein the alternating Rf electric field frequency is between about 50 kHz and about 200 kHz, or a scale inhibiting composition concentration between about 5 ppm and about 100 ppm and wherein the alternating Rf electric field frequency is between about 50 kHz and about 200 kHz.

10. The method of claim 8, wherein the scale inhibiting composition is selected from the group consisting of formic acid, acetic acid, lactic acid, malic acid, maleic acid, tartaric acid, citric acid, 2-hydroxyethyliminodiacetic acid (HEIDA), nitrilotriacetic acid (NTA), hydroxyethyenediaminetriacetic acid (HEDTA), ethylenediaminetetraacetic acid (EDTA), trans-1,2-diaminocyclohexane-N,N,N',N'-tetraacetic acid, monohydrate (CyDTA), 1,4,7,10-tetraazacyclododecane-1,4,7,10-tetraacetic acid (DOTA), amino-polycarboxylic acid, diethylene triaminopentamethylenephosphonic acid, aminotrimethylene phosphonic acid, 1,10-bis(phosphonomethyl)-1,10-diazo-4,7,13,16-tetraoxacyclooctadecane, 1,10-bis(phosphinico(alpha-methyl))-1,10-diazo-4,7,13,16-tetraoxacyclooctadecane, glyoxylic acid, cinnamaldehyde, mineral acids, hexadecyl succimic anhydride, oleic imidazoline, benzyldimethyl hexadecylammonium chloride, cetyl amine, folic acid, 1-hydroxy ethylidene-1,1-diphosphonic acid (HEDP A), diethylenetriamine penta(methylene phosphonic acid) (DTPMP A), alpha beta poly-aspartate, carboxymethyl succinic acid, polytartaric acid, o-succinyl gluconic acid, o-succinyl saccharic acid, polyamino acids, poly(octanediol-co-citrate) (POCA), 2-phosphonobutane-1,2,4-tricarboxylic acid (PBCA), polyepoxysuccinic acid (PESA), polyacrolein, humic acids, fulvic acids, carboxymethyl inulin, vinylidene diphosponic acid, 2-phosphonabutane-1,2,4-tricarboxylic acid, boric acid, dendimers, and mixtures or combinations.

\* \* \* \* \*